United States Patent [19]
Curry et al.

[11] Patent Number: 5,577,178
[45] Date of Patent: Nov. 19, 1996

[54] NEURAL NETWORK FOR COLOR TRANSLATIONS

[76] Inventors: Bo U. Curry, 2671 Washington Ave., Redwood City, Calif. 94061; David R. Smith, 5454 Milligan Dr., San Jose, Calif. 95124

[21] Appl. No.: 566,602

[22] Filed: Dec. 4, 1995

Related U.S. Application Data

[63] Continuation of Ser. No. 80,025, Jun. 18, 1993, abandoned.
[51] Int. Cl.$^6$ ................................................ G06F 15/00
[52] U.S. Cl. ................................................ 395/133
[58] Field of Search ................................ 395/133, 131, 395/2.11, 2.41, 2.68, 21

[56] References Cited

U.S. PATENT DOCUMENTS

| | | | |
|---|---|---|---|
| 5,025,282 | 6/1991 | Nakamura et al. | 355/38 |
| 5,073,867 | 12/1991 | Murphy et al. | 395/27 |
| 5,097,141 | 3/1992 | Leivian et al. | 307/201 |
| 5,103,405 | 4/1992 | Murphy et al. | 395/296 |
| 5,120,996 | 6/1992 | Mead et al. | 307/353 |
| 5,126,685 | 6/1992 | Platt et al. | 330/85 |
| 5,162,899 | 11/1992 | Naka et al. | 358/518 |
| 5,164,837 | 11/1992 | Hirosawa | 358/296 |
| 5,333,241 | 7/1994 | Furuta et al. | 395/27 |
| 5,386,496 | 1/1995 | Arai et al. | 395/22 |

FOREIGN PATENT DOCUMENTS

| | | |
|---|---|---|
| 0525964A2 | 2/1993 | European Pat. Off. . |
| 4-058358 | 2/1992 | Japan . |

OTHER PUBLICATIONS

Stoksik et al.; *A Neural Net Based Color Recognition System;* 1991; pp. 86–90.

Bogatov, V. A.; *Neural Algorithms of Data Performing in Finite Fields GF($2^m$);* 1992; pp. 139–144.

Malakooti et al.; *An Artificial Neural Networks for Approximating Polynomial Functions;* 1992; pp. III–966–III–971.

Liu et al.; *Colour Image Processing by a Neural Network Model;* 1990; pp. 3–6.

Frank F. Little; "Convex Combination Surfaces"; Apr. 25–30, 1982; pp. 100–107.

Peter Alfeld; "Scattered Data Interpolation in Three or More Variables"; 1989; pp. 1–33.

Kang et al., "Neural Network Applications to the Color Scanner and Printer Calibrations", Journal of Electronic Imaging, Apr. 1992, vol. 1(2), pp. 125–135.

*Primary Examiner*—Phu K. Nguyen

[57] ABSTRACT

A neural network for converting pixels represented in one color representation to pixels of a second color representation. One realization of the neural network utilizes an input layer that includes either a summing node or a product generating node. The neural network may be implemented in analog circuitry or as a simulation on a general purpose data processor. The analog circuit implementation requires a relatively small number of nodes and is less expensive than implementations based on general purpose data processors.

4 Claims, 5 Drawing Sheets

NEURAL NETWORK FOR COLOR TRANSLATIONS

CROSS REFERENCE TO RELATED APPLICATION(S)

This is a continuation of application Ser. No. 08/080,025 filed on Jun. 18, 1993, now abandoned.

FIELD OF THE INVENTION

The present invention relates to devices for displaying or scanning color images, and more particularly, to an improved processor for translating colors between different representational schemes.

BACKGROUND OF THE INVENTION

Color images are typically represented by specifying three values for each pixel in the image. For example, the values in question may be the intensity of the primary colors needed to generate the desired color. A number of alternative representations are also known to the art. For the purposes of this discussion, these various representations will be referred to as spectral representations. Given the three values in any one of these spectral representations, the corresponding three values in any other representation may be obtained from an appropriate transformation that can be written in closed form.

Not all display devices work from spectral representations. Consider a color printer which operates by mixing three colors of ink to generate the pixels of an image on the paper. The printer "knows" how to generate a pixel given three ink intensity values, $I_1$, $I_2$, and $I_3$. The device using the printer typically stores its color as (R,G,B) values. The transformation from (R,G,B) representation of a pixel to the corresponding ($I_1$, $I_2$, $I_3$) value cannot, in general, be written in closed form. In such cases, the transformation must be determined experimentally. This is accomplished by printing samples of the colors obtained by mixing known quantities of each ink and then measuring the (R,G,B) values of the sample using a spectrometer. The measured values represent the transformation from the printer color representation ($I_1$, $I_2$, $I_3$) to a (R,G,B) value. The inverse of this transformation may be stored in a look-up table which is used by the printer or a device using the printer to generate the correct ink intensity values for a given (R,G,B) value.

The look-up table approach can require a significant mount of memory and/or processor capacity. In a full color display system, there are typically 256 possible values for each intensity value for each of the primary colors in the representation. Hence, the corresponding look-up table would require in excess of 16 megabytes of memory. This memory requirement is unacceptable for many applications. To reduce the memory, a smaller table can be used with tri-linear interpolation. However, the system now requires a processor capable of performing the interpolation. Such a processor can represent a significant fraction of the cost of a low cost printer.

Similar color transformation problems are encountered with scanning devices. That is, the transformation from the color values produced by the scanner to one of the standard color representations must be generated experimentally and stored in a look-up table.

Broadly, it is the object of the present invention to provide an improved system for converting color values between various color representational schemes.

It is a further object of the present invention to provide a transformation system that does not require a large look-up table.

It is a still further object of the present invention to provide a transformation system that does not require a general purpose digital processor.

These and other objects of the present invention will become apparent to those skilled in the art from the following detailed description of the invention and the accompanying drawings.

SUMMARY OF THE INVENTION

The present invention is a processor for converting pixels of an image in a first color representation in which colors are represented by a first set of signals $(i_1, i_2, \ldots i_M)$ to a second color representation in which colors are represented by a second set of signal $(O_1, O_2, \ldots O_{M'})$. Here, M and M' are greater than two. The processor receives signals specifying the first set of signals. The processor preferably has an ordered array of layers of nodes including an input layer, an output layer, and optionally, one or more intermediate layers. Each node has a plurality of inputs, an output, and a memory for storing a plurality of weight values, there being one weight value corresponding to each input. Each node generates an output that is determined by the weights stored in the node and the inputs to the node. The input layer of nodes includes a plurality of M-input nodes. The inputs of each node in the input layer receive the first set of signals such that the first input to each node receives $i_1$, the second input of each node receives $i_2$, and so on. The output layer of nodes comprises M' nodes, the second set of signals, $(O_1, O_2, \ldots O_{M'})$, corresponding to the outputs of the output layer of nodes. Each input of the nodes in the intermediate layers and output layer is connected either to an output of a node in a previous layer or to one of the first set of signals.

DETAILED DESCRIPTION OF THE INVENTION

Figure 1:
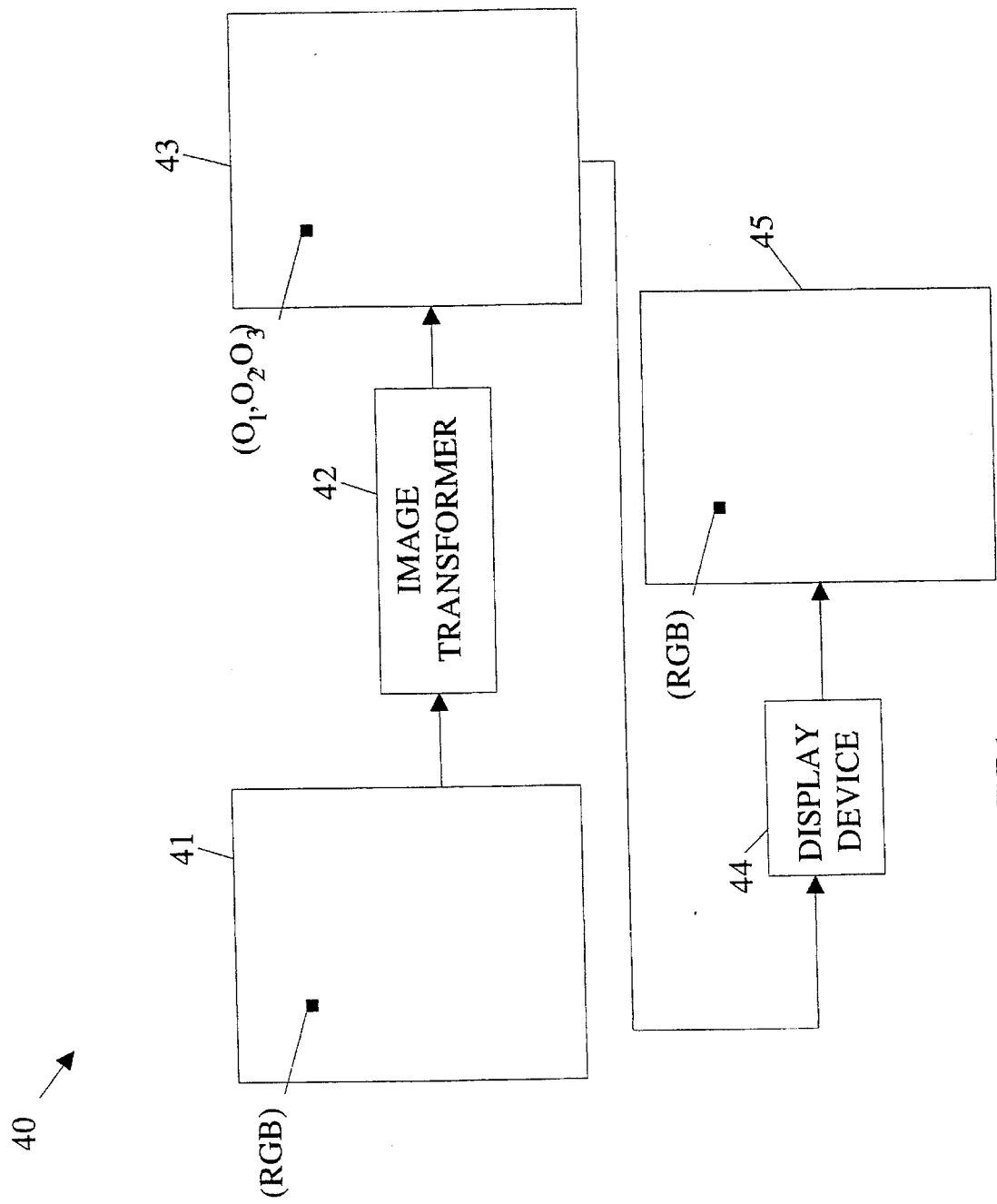
FIG. 1 is a block diagram of a system employing an image transformer according to the present invention.

The present invention will be described in terms of performing the transformation from a spectral color representation (R,G,B) to a display device in which colors are represented by $(O_1, O_2, O_3)$. However, it will be obvious to those skilled in the art that from the following discussion, the method and apparatus taught herein may be used to perform other transformations in which a value represented by a triplet (x,y,z) is to be transformed by an experimentally determined transformation to a second triplet (x',y',z'). Referring to FIG. 1, an image 41 that is represented as pixels having (R,G,B) values is transformed by an image transformer 42 according to the present invention to generate a new image 43 in which the pixels are represented by $(O_1,O_2,O_3)$. The $(O_1,O_2,O_3)$ value corresponding to a given (R,G,B) value is chosen such that image display device 44 will generate a pixel having the (R,G,B) value in question when it receives the $(O_1,O_2,O_3)$ value generated by image transformer 42. It will be assumed that the (R,G,B) values corresponding to a set of $(O_1,O_2,O_3)$ values have been measured experimentally. This set of values will be referred to as the training set in the following discussion.

It should be noted that the output device may not be capable of generating the (R,G,B) value in question. For example, ink based printers can not generate all (R,G,B) values. In this case, an optimal approximation to the value in question is generated.

The present invention utilizes a neural network to provide the mapping from (R,G,B) to $(O_1,O_2,O_3)$. A hardware embodiment of a simple neural network for transforming (R,G,B) values to $(O_1,O_2,O_3)$ values is shown at 10 in FIG. 2. Neural network 10 has an input layer 12 consisting of N 3-input nodes 13 and an output layer 14 consisting of 3 N-input nodes 15. Each output from layer 12 becomes an input to the nodes of layer 14. Each node generates an output signal that depends on the inputs thereto and a set of weight values, them being one weight value corresponding to each input. The weight value utilized for the $i^{th}$ input of the $j^{th}$ node in a layer will be denoted by $^j w_i$. To simplify the notation, the entire set of weights for a particular node will be denoted by bold print and the sub-script omitted; i.e., the set of weights corresponding to the $j^{th}$ node will be denoted by $^j w$. The various layers in neural network 10 use different sets of weights; hence the weights corresponding to layer 14 are denoted by w' to emphasize this difference. The precise computation performed by the nodes will be discussed in more detail below.

The simplest form of node having $N_{in}$ inputs has an output that is given by $$O = F(w_0 + \Sigma_{i=1}^{N_{in}} I_i * w_i) \quad (1)$$

Figure 3:
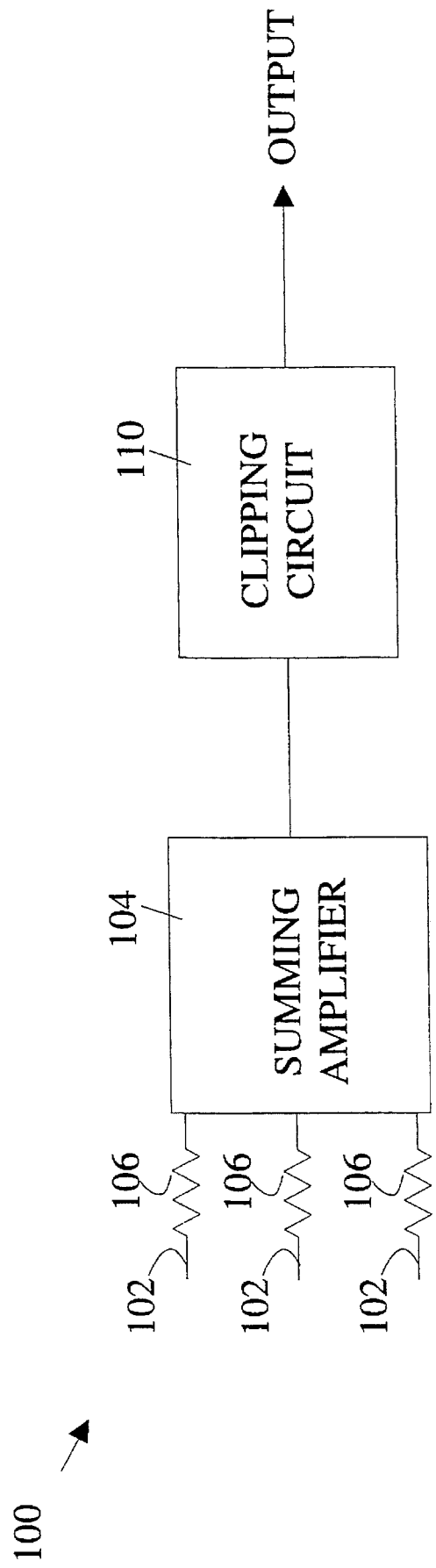
FIG. 3 is a block diagram of one embodiment of a node according to the present invention.

Here, $I_i$ is the $i^{th}$ input to the node, and $w_i$ is the weight associated with that input. The function, F, is typically sigmoidal in shape; however, a wide variety of functions may be used. Such a node can be constructed from a summing amplifier as shown in FIG. 3 at 100. Each input of node 100 is connected to an input 102 of summing amplifier 104 by a resistor 106. The resistance of the resistor is related to the weight value corresponding to the input in question. The output of the summing amplifier is used as the input to clipping circuit 110 which limits the voltage swings. In this simple embodiment, the constant $w_0=0$. If a non-zero constant is desired, a voltage offset can be provided in the output of summing amplifier 104. Nodes of this type are conventional in the art, and hence, will not be discussed in more detail here.

Figure 4:
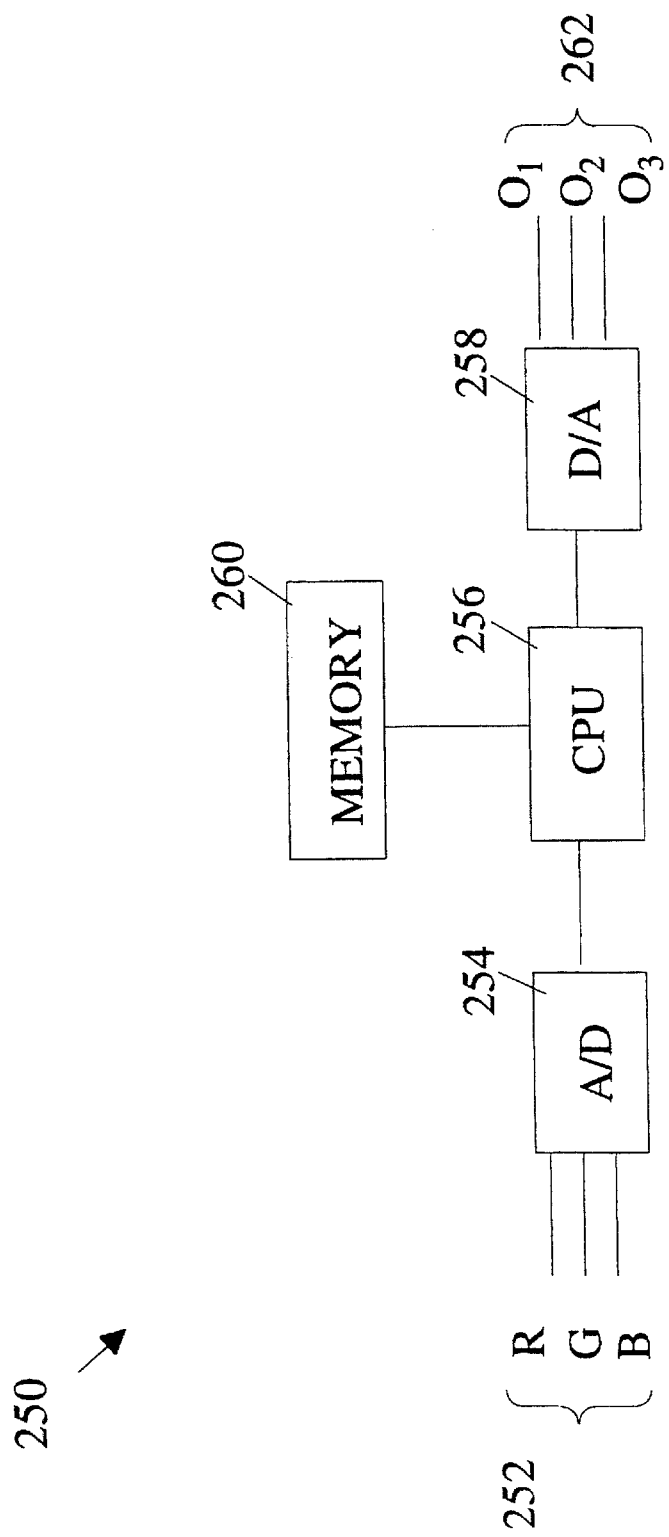
FIG. 4 is a block diagram of an embodiment of a neural network according to the present invention.

More complex node functions, F, can be implemented using conventional data processing circuitry to perform the node computation in digital form. In this case, the individual node computations are performed one at a time in a neural network simulation program. An exemplary neural network of this type is shown in FIG. 4 at 250. The weights are stored in a memory 260. The inputs 252 are converted to digital form by A/D converter 254. Central processing unit (CPU) 256 performs the various neural network computations and generates the outputs in digital form. These outputs can then be transformed to analog form by D/A converters 258. CPU 256 simulates the various nodes by multiplying the corresponding weights and input values. The resultant values are then input to subroutines that compute the corresponding output function F. It will be obvious to those skilled in the art that the A/D and D/A converters may be omitted in systems in which the inputs and outputs are digital in nature.

The proper weight values associated with the neural network are obtained by a "training" protocol that searches for the weight values that most closely reproduce the desired outputs when the training set (R,G,B) values are used as inputs to the neural network. The training set is generated by defining a set of inputs $(I_1,I_2,I_3)_i$ to the display device for which the corresponding outputs of the display device are measured by performing a spectrographic measurement of the output of the device for each (R,G,B) value in the training set. That is, the (R,G,B) values corresponding to $(I_1,I_2,I_3)_i$ are measured for each value of i. Denote this measured value by $^M(R,G,B)_i$. The goal of the training protocol is to choose the weights such that the outputs of the neural network will be $(I_1,I_2,I_3)_i$ when $^M(R,G,B)_i$ is input to the neural network. Algorithms for searching for the weights that minimize the least squares error over the entire set of outputs of a training set are well known to those skilled in the neural network arts; hence, the details of these algorithms will not be discussed here.

Figure 2:
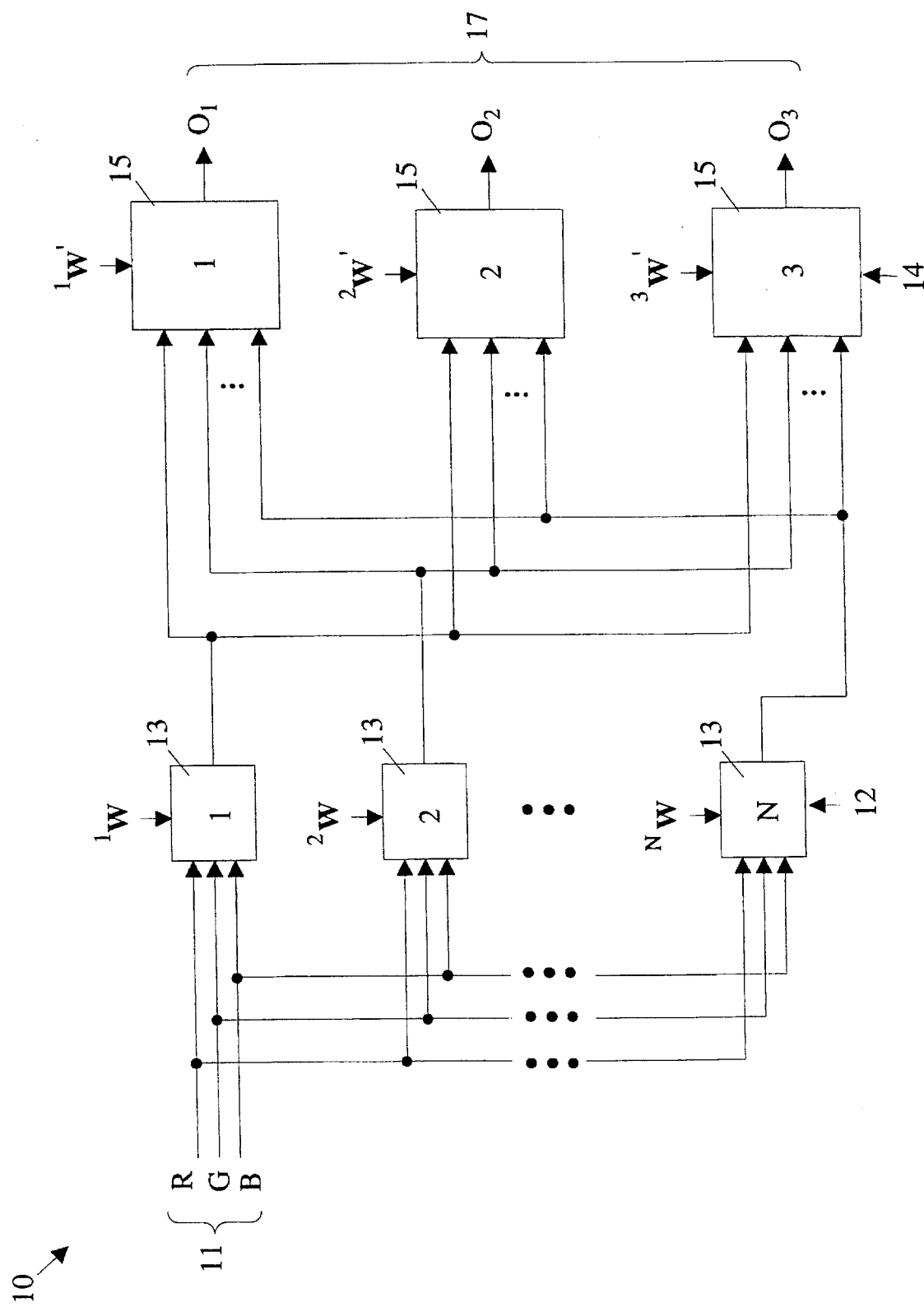
FIG. 2 is a neural network for transforming color values from a spectral representation to another representation in which color is represented by a triplet of values $(O_1, O_2, O_3)$.

While the neural network shown in FIG. 2 can, in principle, be used to provide the desired mapping, it is not the preferred embodiment of the present invention. It has been found experimentally that a neural network of the form shown in FIG. 2 requires a very large number of nodes to accomplish the mapping function in question if the nodes used are described by Eq. (1). To provide a satisfactory mapping, substantially more than 100 nodes are required in layer 12 if the nodes 13 carry out the computation indicated in Eq. (1). Since the cost of the hardware needed to implement the neural network depends on the number of nodes, it is advantageous to choose a neural network design that reduces the number of nodes. It should be noted that similar considerations apply to embodiments of the present invention that are implemented on general purpose computational hardware. The time needed to transform a (R,G,B) value to a $(O_1,O_2,O_3)$ value will depend on the number of nodes in the neural network.

Hence, the preferred embodiment of the present invention utilizes different computational functions in the first layer when a structure such as that shown in FIG. 1 is utilized. If node 13 is to be implemented in analog hardware, a different form of computation is preferred. Analog processors that compute a bell-shaped function of the distance between two points in a three-dimensional space are known to the prior art (For example, see U.S. Pat. Nos. 5,120,996 and 5,126,685 to Mead, et al. and Platt, et. al., respectively). That is, $$O = F[\Sigma_{j=1}^{3} (I_j - w_j)^2] \quad (2)$$

where F(x) is a monotonically decreasing function of x. The weights are chosen by optimizing the performance of the neural network over the training set as discussed above. Alternatively, the weights may be preselected according to various criteria. For example, the weights may be chosen to be evenly distributed over the possible $(I_1,I_2,I_3)$ values. Similarly, the weights may be chosen to be evenly distributed over the possible $(O_1,O_2,O_3)$ values. It has been found experimentally that this type of neural network provides a satisfactory mapping circuit with approximately 100 nodes. The precise number of nodes depends on the manner in which the weights are determined. If preselected weights are utilized, more nodes are required. If the weights are determined from a training set, fewer nodes are needed.

Figure 5:
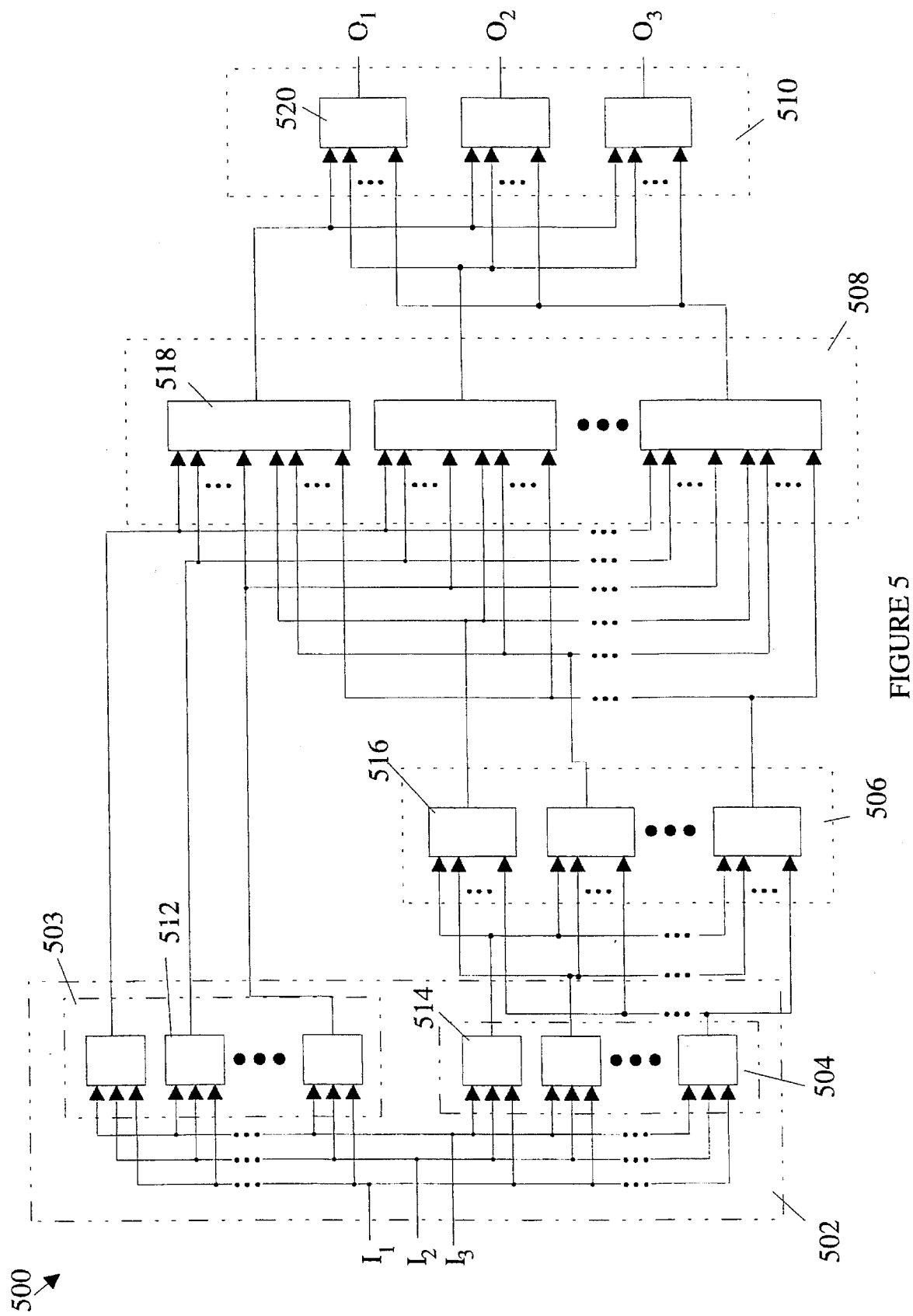
FIG. 5 is a block diagram of the preferred embodiment of the present invention.

As noted above, the present invention may also be implemented on a general purpose computer that simulates the neural network. In such an embodiment, the goal is to minimize the amount of memory needed to implement the transformation. An embodiment of a neural network according to the present invention which is preferably implemented on a general purpose digital computer is shown in FIG. 5 at 500. Neural network 500 may be viewed as containing four layers of nodes, an input layer 502, two intermediate layers 506 and 508, and an output layer 510.

Input layer 502 is further divided into two-layers 503 and 504. The computational functions carried out by the nodes in these sub-layers differ in the different sub-layers. The nodes of sub-layer 503 perform a summing computation of the type described in Eq. (1). A typical such node is shown at 512. This type of node will be referred to as summing node in the following discussion. The nodes in sub-layer 504 perform a computation of the form $$O = F\left( \prod_{i=1}^{3} I_i^{w_i} \right) \quad (3)$$

Here O is the output signal from the node, the $I_i$ are the inputs to the node, and the $w_i$ are the weights corresponding to the node. This type of node will be referred to as product node in the following discussion.

Intermediate layer 506 is constructed from summing nodes of which node 516 is typical. Intermediate layer 506 is only connected to sub-layer 504 in the preferred embodiment of the present invention. The combination of intermediate layer 506 and sub-layer 504 provides a means for modeling transformations that are well represented by polynomial approximations. Intermediate layer 508 is also constructed from summing nodes of which node 518 is typical.

Output layer 510 is constructed from 3 summing nodes in which the output function F is linear and $w_0$ is zero. This type of summing unit will be referred to as a linear unit in the following discussion.

Satisfactory approximations to a spectral to printer transformation have been demonstrated with neural network 500 with less than 50 nodes. A satisfactory embodiment of design shown in FIG. 5 was obtained when layer 504 contained 20 summing nodes and 10 product nodes. Layer 506 contained 10 summing nodes, and layer 508 contained 15 summing nodes.

The above embodiments of the present invention have been described in terms of transforming a spectral representation to a color representation used by an output device such as a color printer. However, it will be apparent to those skilled in the art that the present invention may be used to transform the output of an input device such as a scanner to a spectral representation for processing in a data processing system. In general, the present invention may be used for converting a first color representation in which colors are represented by a first triplet of values $(i_1,i_2,i_3)$ to a second color representation in which colors are represented by a second triplet of values $(O_1,O_2,O_3)$.

The above embodiments of the present invention have been described in terms of color representations utilizing three colors. There are, however, color representations in which more than three colors are utilized. For example, some color printers utilize representations having four colors. It will be apparent to those skilled in the art that the present invention may also be utilized with such redundant color schemes. In this case, either the number of input or output colors, or both would be greater than three. That is, the invention would accept a first set of signal values $(i_1,i_2, \ldots i_M)$, where M is the number of colors in the first representation and output a second set of signal values $(O_1,O_2, \ldots O_{M'})$, where M' is the number of colors in the second representation. Here, M and M' must be greater than two.

Various modifications to the present invention will become apparent to those skilled in the art from the foregoing description and accompanying drawings. Accordingly, the present invention is to be limited solely by the scope of the following claims.

What is claimed is:

1. A processor for converting pixels of an image in a first color representation in which colors are represented by a first set of signal values $(i_1,i_2, \ldots i_M)$ to a second color representation in which colors are represented by a second set of signal values $(O_1,O_2, \ldots O_{M'})$, said processor comprising:

means for receiving signals indicative of said first set of signal values;

an ordered array of layers including an input layer, an output layer and, one or more intermediate layers, each said layer comprising a plurality of nodes, each said node having a plurality of inputs, an output, and means for storing a plurality of weights, there being one said weight corresponding to each said input, each said node generating an output signal on said output that depends on the inputs to said node and said weights stored in said node, wherein said input layer comprises a plurality of M-input nodes, said inputs of each said node in said input layer being connected to said signal receiving means such that the first input to each said node receives $i_1$, the second input of each said node receives $i_2$, and the $M^{th}$ input of each said node receives $i_M$, said output layer comprises M' nodes, said second set of signals, $(O_1,O_2, \ldots O_{M'})$, corresponding to said outputs of said output layer;

wherein each said input of said nodes in said intermediate layers and output layer is connected either to an output of a node in a previous layer or to said signal receiving means, and the relationship between the output signal generated by at least one of said nodes in said input layer and said inputs to said one of said nodes is given by $$O = F\left( \prod_{i=1}^{3} I_i^{w_i} \right)$$

where O is said output signal generated by one of said nodes, $I_i$ is the $i^{th}$ input to said one of said nodes, and $w_i$ is the weight corresponding to the $i^{th}$ said input of said one of said nodes.

2. A processor for converting pixels of an image in a first color representation in which colors are represented by a first set of signal values $(i_1,i_2, \ldots i_M)$ to a second color representation in which colors are represented by a second set of signal values $(O_1,O_2, \ldots O_{M'})$, said processor comprising:

means for receiving signals indicative of said first set of signal values;

an ordered array of layers including an input layer, an output layer and, one or more intermediate layers, each said layer comprising a plurality of nodes, each said node having a plurality of inputs, an output, and means for storing a plurality of weights, there being one said weight corresponding to each said input, each said node generating an output signal on said output that depends on the inputs to said node and said weights stored in said node, wherein said input layer comprises a plurality of M-input nodes, said inputs of each said node in said input layer being connected to said signal receiving means such that the first input to each said node receives $i_1$, the second input of each said node receives $i_2$, and the $M^{th}$ input of each said node receives $i_M$, said output layer comprises M' nodes, said second set of signals, $(O_1, O_2, \ldots O_{M'})$, corresponding to said outputs of said output layer;

wherein each said input of said nodes in said intermediate layers and output layer is connected either to an output of a node in a previous layer or to said signal receiving means, and wherein the relationship between the output signal generated at least one of said nodes in said input layer and said inputs to said one of said nodes is given by $$O = F[\Sigma_{j=1}^{3} (I_j - w_j)^2]$$

where O is said output signal, $I_i$ is the $i^{th}$ input to said one of said nodes, and $w_i$ is the weight corresponding to the $i^{th}$ said input of said one of said nodes.

3. A method for operating a data processing system so as to convert pixels of an image in a first color representation in which colors are represented by a first set of signal values $(i_1, i_2, \ldots i_M)$ to a second color representation in which colors are represented by a second set of signal values $(O_1, O_2, \ldots O_{M'})$, said method comprising the steps of:

causing a receiving means to receive said first set of signal values;

simulating an ordered array of layers including an input layer, an output layer and, one or more intermediate layers of nodes, each said layer comprising a plurality of nodes, each said node having a plurality of inputs, an output, and means for storing a plurality of weights, there being one said weight corresponding to each said input, each set node generating an output signal on said output that depends on the inputs to said node and said weights stored in said node, wherein said input layer comprises a plurality of M-input nodes, said inputs of each said node in said input layer being connected to said signal receiving means such that the first input to each said node receives $i_1$, the second input of each said node receives $i_2$, and the $M^{th}$ input of each said node receives $i_M$, said output layer comprises M' nodes, said second set of signals, $(O_1, O_2, \ldots O_{M'})$, corresponding to said outputs of said output layer of nodes, wherein each said input of said nodes in said intermediate layers and output layer is connected either to an output of a node in a previous layer or to said signal receiving means and the relationship between the output signal generated by at least one of said nodes in said input layer and said inputs to said one of said nodes is given by $$O = F\left( \prod_{i=1}^{3} I_i^{w_i} \right)_2$$

where O is said output signal generated by one of said nodes, $I_i$ is the $i^{th}$ input to said one of said nodes, and $w_i$ is the weight corresponding to the $i^{th}$ said input of said one of said nodes.

4. A method for operating a data processing system so as to convert pixels of an image in a first color representation in which colors are represented by a first set of signal values $(i_1, i_2, \ldots i_M)$ to a second color representation in which colors are represented by a second set of signal values $(O_1, O_2, \ldots O_{M'})$, said method comprising the steps of:

causing a receiving means to receive said first set of signal values;

simulating an ordered array of layers including an input layer, an output layer and, one or more intermediate layers, each said layer comprising a plurality of nodes, each said node having a plurality of inputs, an output, and means for storing a plurality of weights, there being one said weight corresponding to each said input, each set node generating an output signal on said output that depends on the inputs to said node and said weights stored in said node, wherein said input layer comprises a plurality of M-input nodes, said inputs of each said node in said input layer being connected to said signal receiving means such that the first input to each said node receives $i_1$, the second input of each said node receives $i_2$, and the $M^{th}$ input of each said node receives $i_M$, said output layer comprises M' nodes, said second set of signals, $(O_1, O_2, \ldots O_{M'})$, corresponding to said outputs of said output layer, wherein each said input of said nodes in said intermediate layers and output layer is connected either to an output of a node in a previous layer or to said signal receiving means, and the relationship between the output signal generated by at least one of said nodes in said input layer and said inputs to said one of said nodes is given by $$O = F[\Sigma_{j=1}^{3} (I_j - w_j)^2]$$

where O is said output signal generated by one of said nodes, $I_i$ is the $i^{th}$ input to said one of said nodes, and $w_i$ is the weight corresponding to the $i^{th}$ said input of said one of said nodes.

* * * * *